(12) United States Patent
Hsieh

(10) Patent No.: US 6,854,916 B2
(45) Date of Patent: Feb. 15, 2005

(54) RETRACTABLE ROD ASSEMBLY

(76) Inventor: David Hsieh, 3F, No. 2, Chin-Chang St., Taichung City (TW)

(*) Notice: Subject to any disclaimer, the term of this patent is extended or adjusted under 35 U.S.C. 154(b) by 0 days.

(21) Appl. No.: 10/150,396

(22) Filed: May 17, 2002

(65) Prior Publication Data

US 2003/0215283 A1 Nov. 20, 2003

(51) Int. Cl.$^7$ .................................................. F16B 7/10
(52) U.S. Cl. ............................... 403/109.3; 403/109.1; 403/109.6
(58) Field of Search ........................... 403/109.1, 109.2, 403/109.3, 109.6

(56) References Cited

U.S. PATENT DOCUMENTS

| | | | | |
|---|---|---|---|---|
| 2,980,456 A | * | 4/1961 | McMullin | 403/328 |
| 4,047,821 A | * | 9/1977 | Hoke et al. | 403/109.3 |
| 4,247,216 A | * | 1/1981 | Pansini | 403/109.3 |
| 4,385,849 A | * | 5/1983 | Crain | 403/109.3 |
| 4,595,383 A | * | 6/1986 | Nienhaus | 464/162 |
| 4,793,646 A | * | 12/1988 | Michaud, Jr. | 294/19.1 |
| 5,287,869 A | * | 2/1994 | Wu | 135/25.1 |
| 5,387,048 A | * | 2/1995 | Kuo | 403/109.3 |
| 5,515,574 A | * | 5/1996 | Larson | 16/429 |
| 5,593,196 A | * | 1/1997 | Baum et al. | 294/19.1 |
| 5,727,898 A | * | 3/1998 | Lu | 403/325 |
| 5,775,352 A | * | 7/1998 | Obitts | 135/69 |
| 5,779,386 A | * | 7/1998 | Eichhorn | 403/329 |
| 6,006,477 A | * | 12/1999 | Ko | 403/109.1 |
| 6,055,762 A | * | 5/2000 | Philpot | 43/11 |
| 6,079,894 A | * | 6/2000 | Obitts | 403/109.3 |
| 6,213,672 B1 | * | 4/2001 | Varga | 403/109.2 |
| 6,224,072 B1 | * | 5/2001 | Weck et al. | 280/47.35 |
| 6,435,754 B1 | * | 8/2002 | Canale | 403/109.2 |

* cited by examiner

Primary Examiner—Robert E. Pezzuto
Assistant Examiner—Nathan Mammen
(74) Attorney, Agent, or Firm—Marger Johnson & McCollom, P.C.

(57) ABSTRACT

A retractable rod assembly includes outer and inner tubes, and a positioning device. An outer tube wall of the outer tube has two outer radial holes formed therein. An inner tube wall of the inner tube has two inner radial holes formed therein. The positioning device includes a mounting block and two spring-loaded retainers. The mounting block is disposed in the inner tube, and is formed with a pair of retainer passages respectively aligned with the inner radial holes. Each of the spring-loaded retainers, which are disposed respectively in the retainer passages, includes a retaining pin and a biasing member for biasing the retaining pin to extend out of aligned ones of the inner and outer radial holes to releasably secure the outer and inner tubes in an extended state.

5 Claims, 8 Drawing Sheets

RETRACTABLE ROD ASSEMBLY

BACKGROUND OF THE INVENTION

1. Field of the Invention

The invention relates to a retractable rod assembly, more particularly to a retractable rod assembly having a positioning device that can securely retain outer and inner tubes in an extended state.

2. Description of the Related Art

Referring to FIGS. 1, 2 and 3, a conventional telescopic rod 10 is shown to comprise an inner tube 11, an outer tube 12 sleeved on the inner tube 11 and slidable along the length of the inner tube 11, and a positioning device 20 disposed in the inner tube 11. The inner tube 11 is formed with a radial positioning hole 111. The outer tube 12 is formed with a plurality of radial adjusting holes 121 that are spaced apart from each other along the length of the outer tube 12. The positioning device 20 includes a leaf spring 21 disposed in the inner tube 11, and a positioning button 22 mounted on one end of the leaf spring 21. The positioning button 22 extends out of the positioning hole 111 in the inner tube 11 and through one of the adjusting holes 121 in the outer tube 12. When adjusting the length of the telescopic rod 10, the positioning button 22 is first pushed against the biasing action of the leaf spring 21 such that the positioning button 22 ceases to extend into any of the adjusting holes 121 in the outer tube 12. Then, the outer tube 12 is slid relative to the inner tube 11 until a selected one of the adjusting holes 121 is aligned with the positioning hole 111. At this time, due to the resiliency of the leaf spring 21, the positioning button 22 will automatically extend through the selected adjusting hole 121 to retain the telescopic rod 10 at the desired length.

The following are some of the drawbacks of the conventional telescopic rod 10:

Due to manufacturing constraints, a little space is present between the inner tube 11 and the outer tube 12. Because positioning between the inner and outer tubes 11, 12 is achieved at a single point, wobbling between the inner and outer tubes 11, 12 easily occurs, which is worse when the telescopic rod 10 is relatively long.

Moreover, since the positioning button 22 projects through the outer tube 12, accidental pressing of the same is likely to occur. In the event that the positioning button 22 was accidentally pushed such that it is disengaged from the outer tube 12, undesired movement of the outer tube 12 relative to the inner tube 11 can occur.

Furthermore, the V-shaped leaf spring 21 easily suffers from elastic deformation, and the precision of positioning will decrease such that the service life of the positioning device 20 is accordingly relatively short.

SUMMARY OF THE INVENTION

Therefore, the object of the present invention is to provide a retractable rod assembly that can overcome the aforesaid drawbacks commonly associated with the conventional telescopic rod.

Accordingly, a retractable rod assembly of this invention comprises an outer tube, an inner tube, and a positioning device.

The outer tube has an outer tube wall that defines an outer tube axis. The outer tube wall has first and second outer radial holes formed therein. The first and second outer radial holes form a first angle that ranges from 90 to 180 degrees therebetween with respect to the outer tube axis, and are spaced apart from each other by a first distance along the outer tube axis.

The inner tube has an inner tube wall that defines an inner tube axis. The inner tube wall has first and second inner radial holes formed therein. The first and second inner radial holes form a second angle equal to the first angle therebetween with respect to the inner tube axis, and are spaced apart from each other by a second distance equal to the first distance along the inner tube axis.

The inner tube is inserted into the outer tube to bring the inner tube axis to coincide with the outer tube axis and to align the first and second inner radial holes with the first and second outer radial holes, respectively, in an extended state of the outer and inner tubes.

The positioning device includes a mounting block and a pair of spring-loaded retainers. The mounting block is disposed in the inner tube, and is formed with a pair of retainer passages that are respectively aligned with the first and second inner radial holes. Each of the spring-loaded retainers, which are disposed respectively in the retainer passages, includes a retaining pin and a biasing member for biasing the retaining pin to extend out of a respective one of the first and second inner radial holes and into a respective one of the first and second outer radial holes to releasably secure the outer and inner tubes in the extended state.

BRIEF DESCRIPTION OF THE DRAWINGS

Other features and advantages of the present invention will become apparent in the following detailed description of the preferred embodiments with reference to the accompanying drawings, of which.

DETAILED DESCRIPTION OF THE PREFERRED EMBODIMENTS

Figure 1:
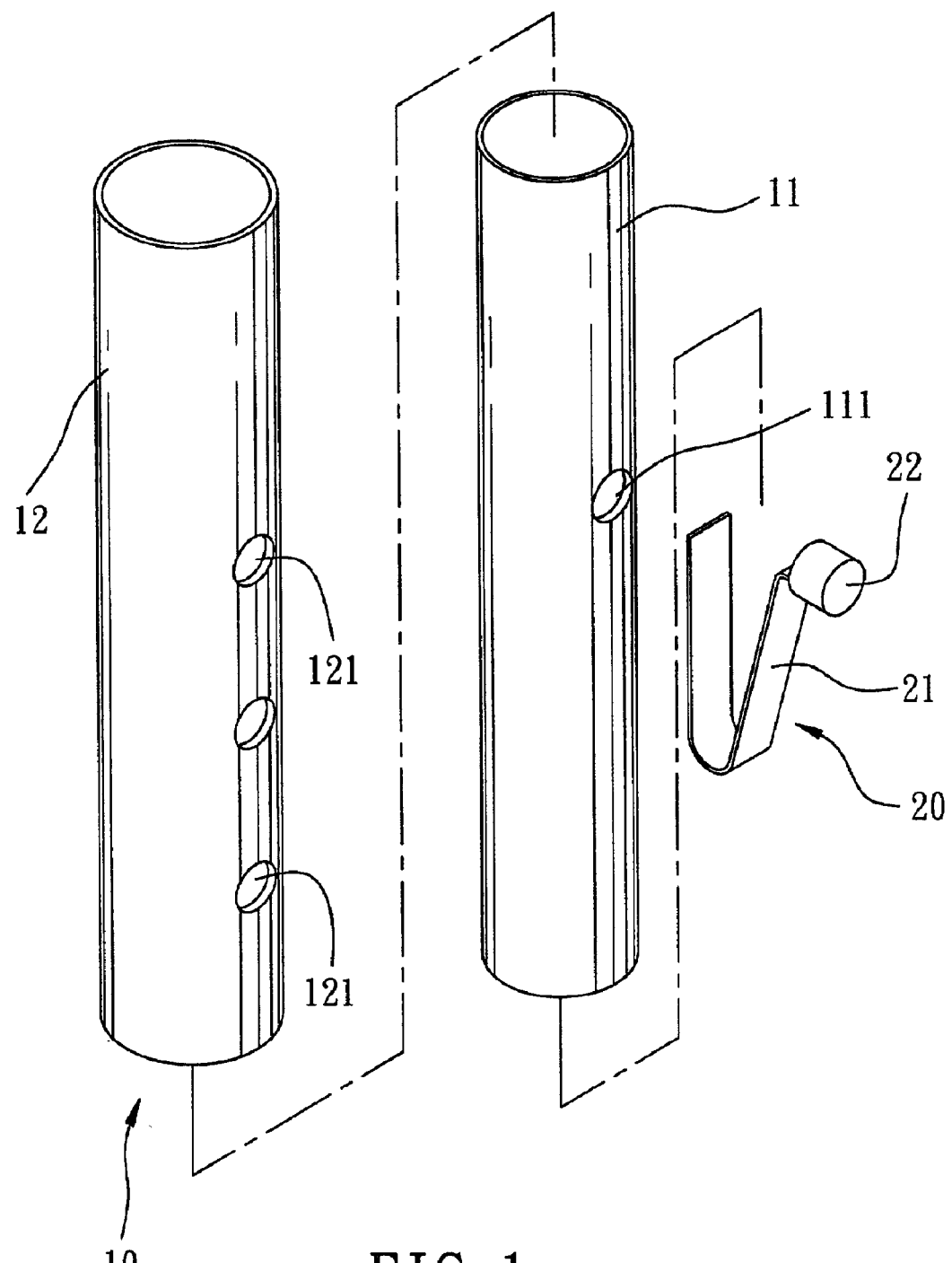
FIG. 1 is an exploded perspective view illustrating a conventional telescopic rod.
Figure 2:
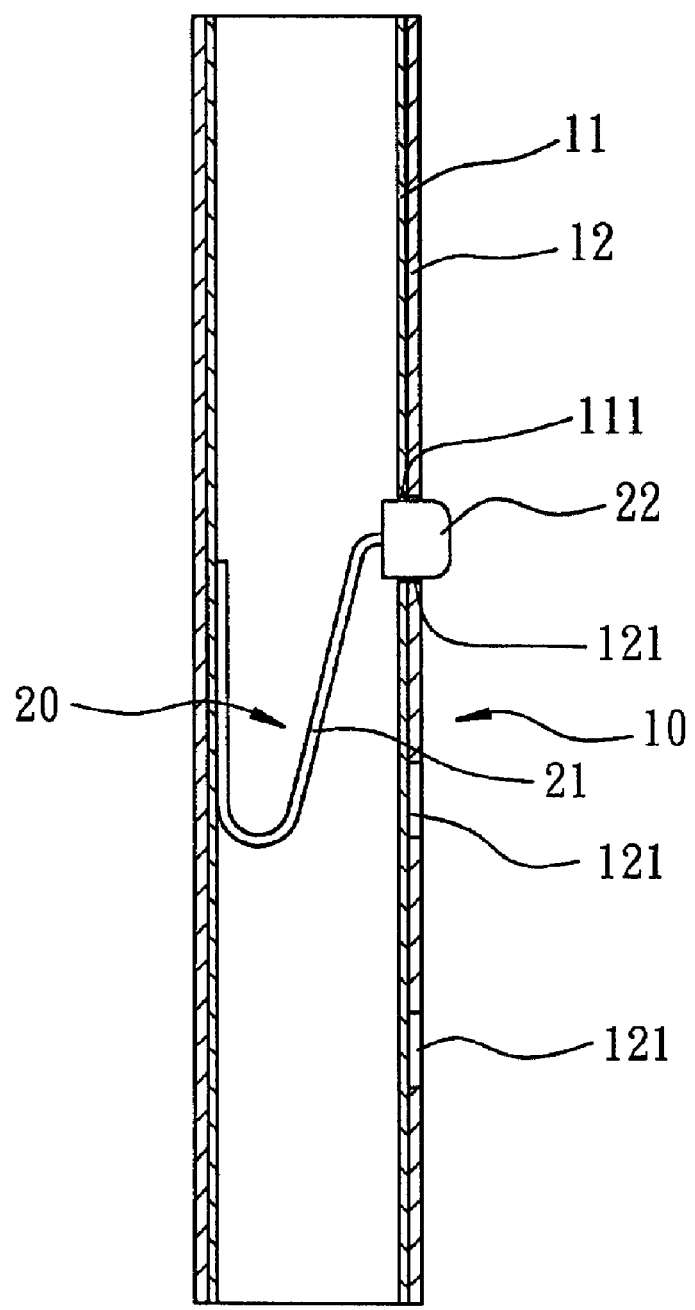
FIGS. 2 and 3 are sectional views of the conventional telescopic rod.
Figure 3:
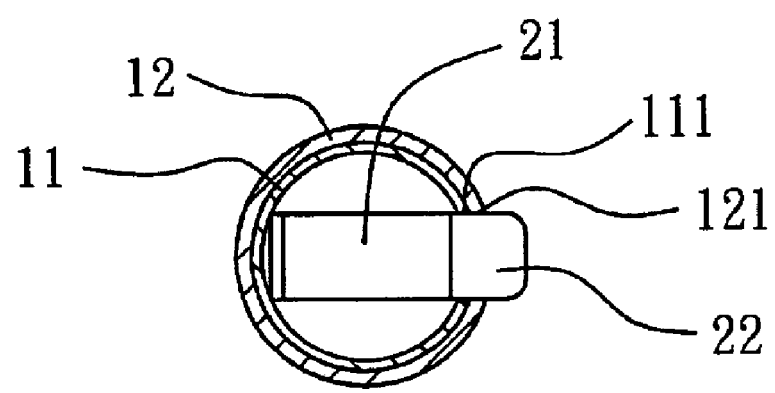
Figure 4:
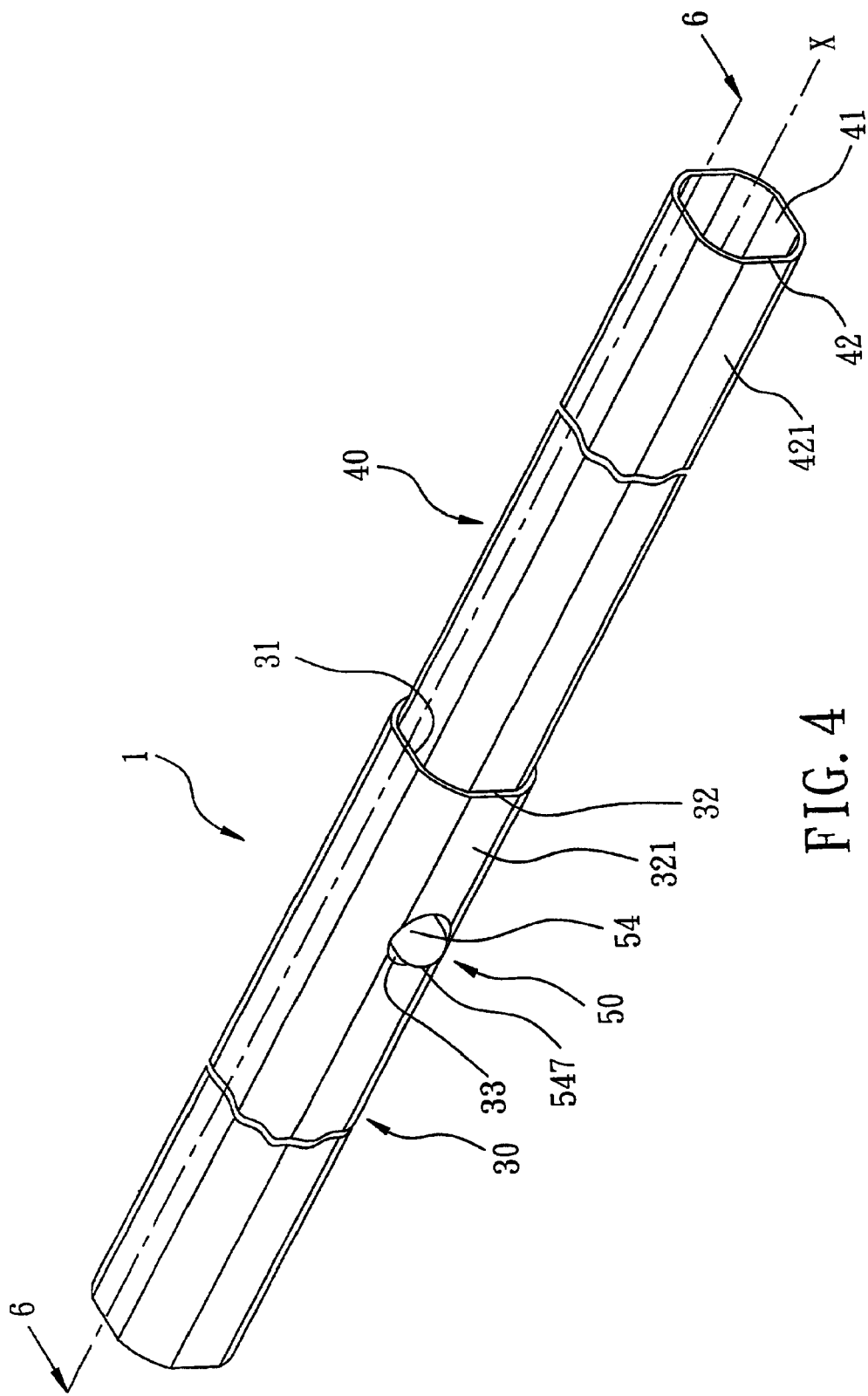
FIG. 4 is an assembled perspective view showing the first preferred embodiment of a retractable rod assembly according to the present invention.
Figure 5:
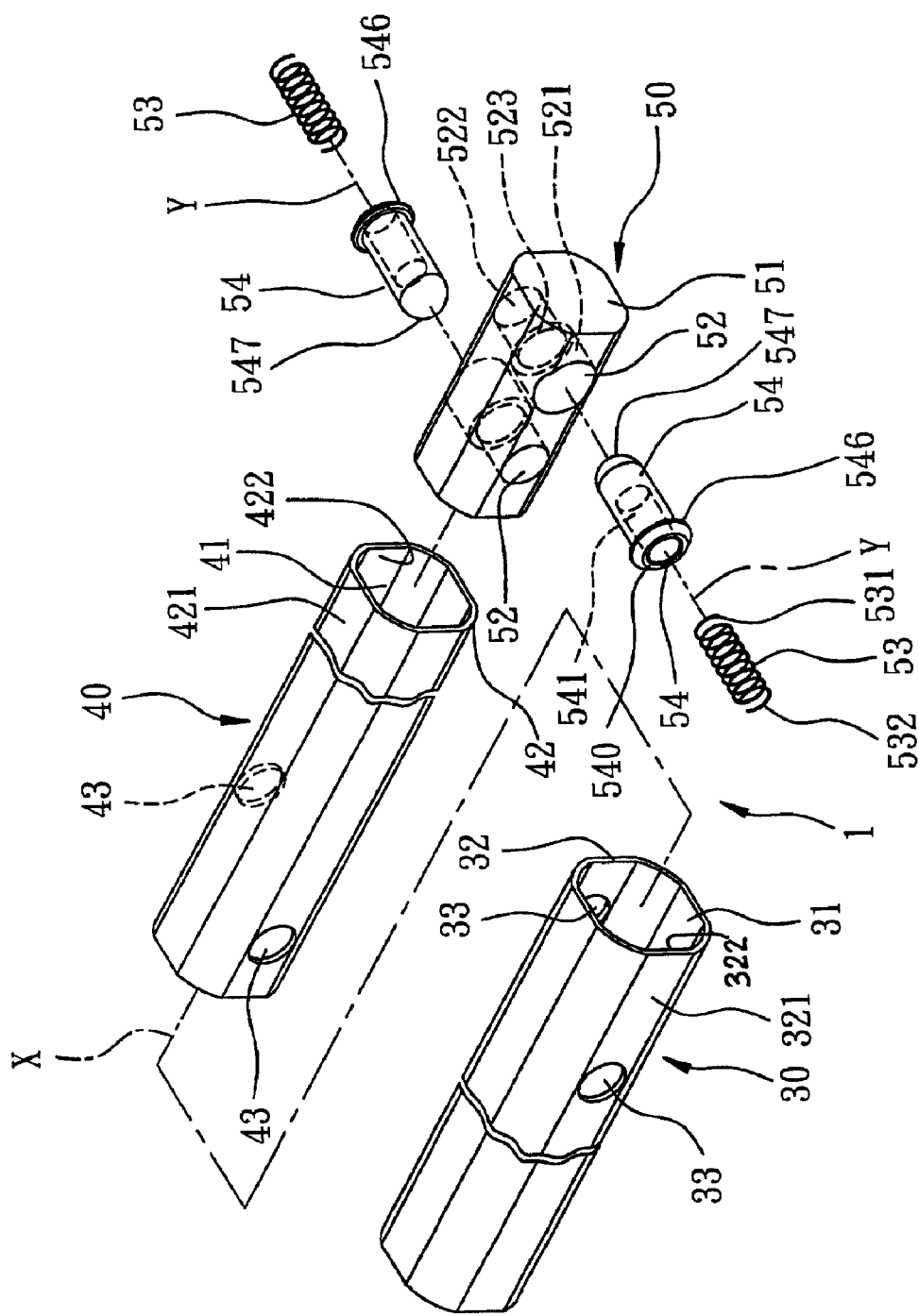
FIG. 5 is an exploded perspective view of the first preferred embodiment.
Figure 6:
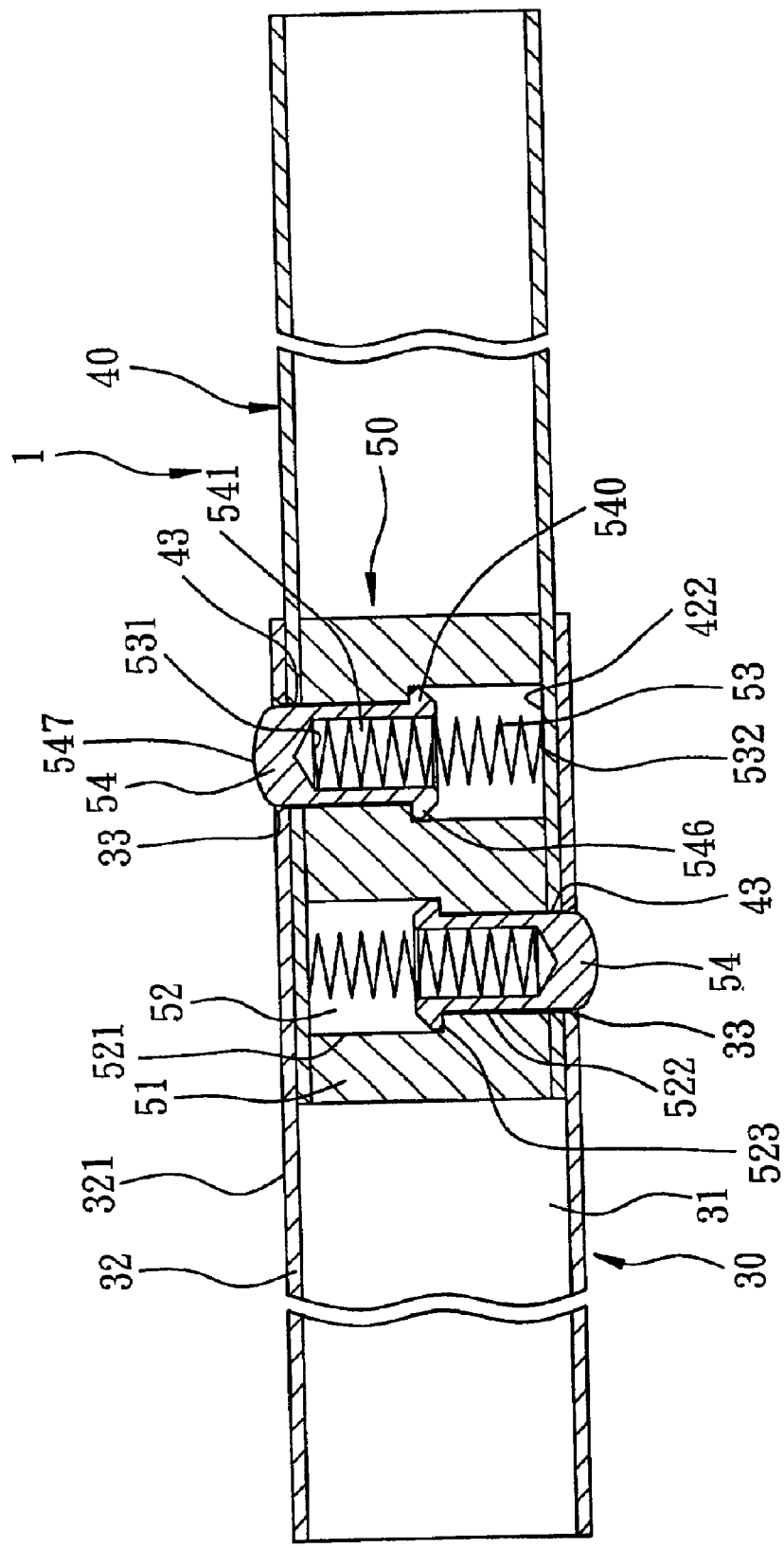
FIG. 6 is a sectional view of the first preferred embodiment taken along line 6—6 of FIG. 4.

Referring to FIGS. 4, 5 and 6, the first preferred embodiment of a retractable rod assembly 1 according to the present invention is shown to comprise an outer tube 30, an inner tube 40 inserted into the outer tube 30, and a positioning device 50.

The outer tube 30 has an outer tube wall 32 that defines an outer tube axis and that confines an axial tube hole 31 with a non-circular cross-section. The outer tube wall 32 has an outer wall surface 321, and further has first and second outer radial holes 33 formed therein. The first and second outer radial holes 33 form a first angle that ranges from 90 to 180 degrees with respect to the outer tube axis, and are spaced apart from each other by a first distance along the outer tube axis. In this embodiment, the first angle is 180 degrees.

The inner tube 40 has an inner tube wall 42 that defines an inner tube axis, that confines an axial tube hole 41, and that has a non-circular cross-section. The cross-section of the axial tube hole 31 of the outer tube 30 complements the non-circular cross-section of the inner tube wall 42. The inner tube wall 42 has an outer wall surface 421, and further has first and second outer radial holes 43 formed therein. The first and second inner radial holes 43 form a second angle equal to the first angle therebetween with respect to the inner tube axis, and are spaced apart from each other by a second distance equal to the first distance along the inner tube axis.

The inner tube 40 is inserted into the outer tube 30 to bring the inner tube axis to coincide with the outer tube axis to result in a common rod axis (X), and to align the first and second inner radial holes 43 with the first and second outer radial holes 33, respectively, in an extended state of the outer and inner tubes 30, 40.

The positioning device 50 includes a mounting block 51 disposed in the inner tube 40. The mounting block 51 is formed with a pair of retainer passages 52 that are respectively aligned with the first and second inner radial holes 43. The positioning device 50 further includes a pair of spring-loaded retainers disposed respectively in the retainer passages 52. Each of the spring-loaded retainers includes a retaining pin 54 and a biasing member 53, such as a coiled compression spring, for biasing the retaining pin 54 to extend out of a respective one of the first and second inner radial holes 43 and into a respective one of the first and second outer radial holes 33 to releasably secure the outer and inner tubes 30, 40 in the extended state.

The retaining pin 54 defines a pin axis (Y), and has an inner end 540, a curved outer end 547 opposite to the inner end 540 along the pin axis (Y), a blind hole 541 that extends from the inner end 540 toward the outer end 547, and a limit flange 546 that extends radially and outwardly from the inner end 540. Each of the retainer passages 52 has a large-diameter portion 521 and a small-diameter portion 522. The outer end 547 of the retaining pin 54 of each of the spring-loaded retainers extends out of the respective one of the first and second inner radial holes 43 and into the respective one of the first and second outer radial holes 33 via the small-diameter portion 522 of the respective one of the retainer passages 52. The inner end 540 of the retaining pin 54 of each of the spring-loaded retainers is disposed in the large-diameter portion 521 of the respective one of the retainer passages 52, and is hindered at a junction 523 of the large-diameter portion 521 and the small-diameter portion 522 by the limit flange 546 from extending into the small-diameter portion 522 of the respective one of the retainer passages 52. The biasing member 53 has a first biasing end 531 that extends into the blind hole 541 and that abuts against the retaining pin 54, and a second biasing end 532 that extends out of the blind hole 541 and that abuts against an inner wall surface 422 of the inner tube wall 42.

During assembly, the biasing members 53 are first disposed in the blind holes 541 of the retaining pins 54, respectively. Then, each retaining pin 54 is disposed in the respective one of the retainer passages 52 of the mounting block 51 via the large-diameter portion 521. Thereafter, the biasing members 53 are compressed in sequence such that the mounting block 51 can be slid into the axial tube hole 41 of the inner tube 40 and such that the second biasing ends 532 of the biasing members 53 abut against the inner wall surface 422 of the inner tube wall 42. Since the cross-section of the mounting block 51 matches that of the inner tube wall 42, when the mounting block 51 is slid into the axial tube hole 41, the mounting block 51 will be prevented from rotating inside the inner tube 40. The mounting block 51 is slid until the retaining pins 54 are aligned with the first and second inner radial holes 43 in the inner tube 40. At this time, the biasing members 53 will bias the retaining pins 54 to extend out of the first and second inner radial holes 43, respectively. The positioning device 50 is mounted within the inner tube 40 at this time. Subsequently, when inserting the inner tube 40 into the outer tube 30, the retaining pins 54 are pressed in sequence to allow an inner wall surface 322 of the outer tube wall 32 to slide over the outer ends 547 of the retaining pins 54 until the retaining pins 54 are aligned with the first and second outer radial holes 33 in the outer tube 30. At this time, the biasing members 53 will bias the retaining pins 54 to extend into the first and second outer radial holes 33, respectively, thereby releasably securing the outer and inner tubes 30, 40 in the extended state.

To retract the rod assembly 1, because the retaining pins 54 form an angle of 180 degrees therebetween, the rod assembly 1 is held such that the retaining pins 54 are pressed by the thumb and the index finger so that the outer ends 547 of the retaining pins 54 cease to extend into the first and second outer radial holes 33 in the outer tube 30. The outer tube 30 can be slid relative to the inner tube 40 at this time.

In the first preferred embodiment of this invention, the retaining pins 54 protrude from the outer wall surface 321 of the outer tube wall 32 in the extended state of the outer and inner tubes 30, 40. However, it is feasible for the manufacturer to tailor the lengths of the retaining pins 54 so that the retaining pins 54 will not protrude from the outer surface 321 of the outer tube wall 32 to minimize the risk of unintentional pressing of the retaining pins 54.

Figure 7:
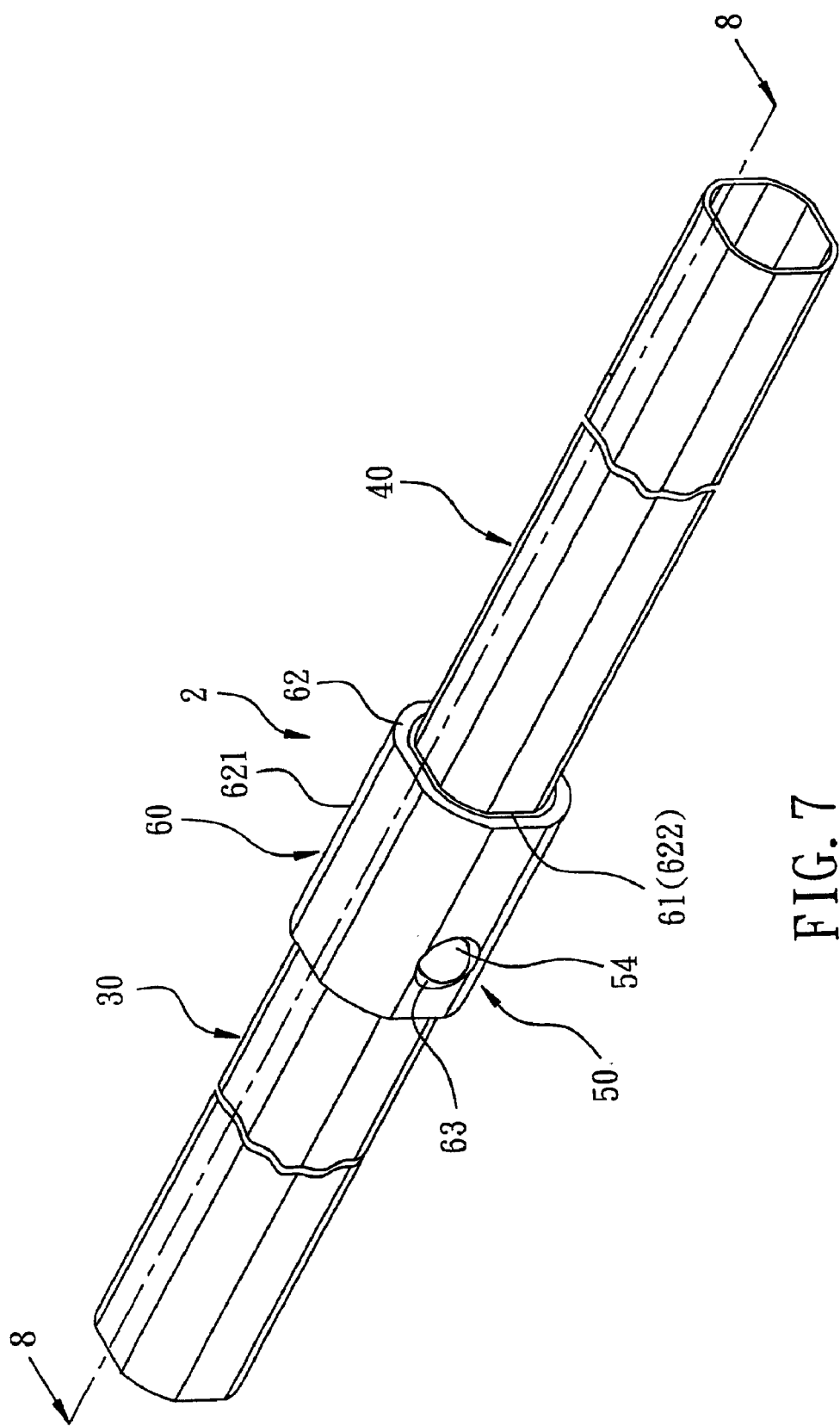
FIG. 7 is an assembled perspective view showing the second preferred embodiment of a retractable rod assembly according to the present invention.
Figure 8:
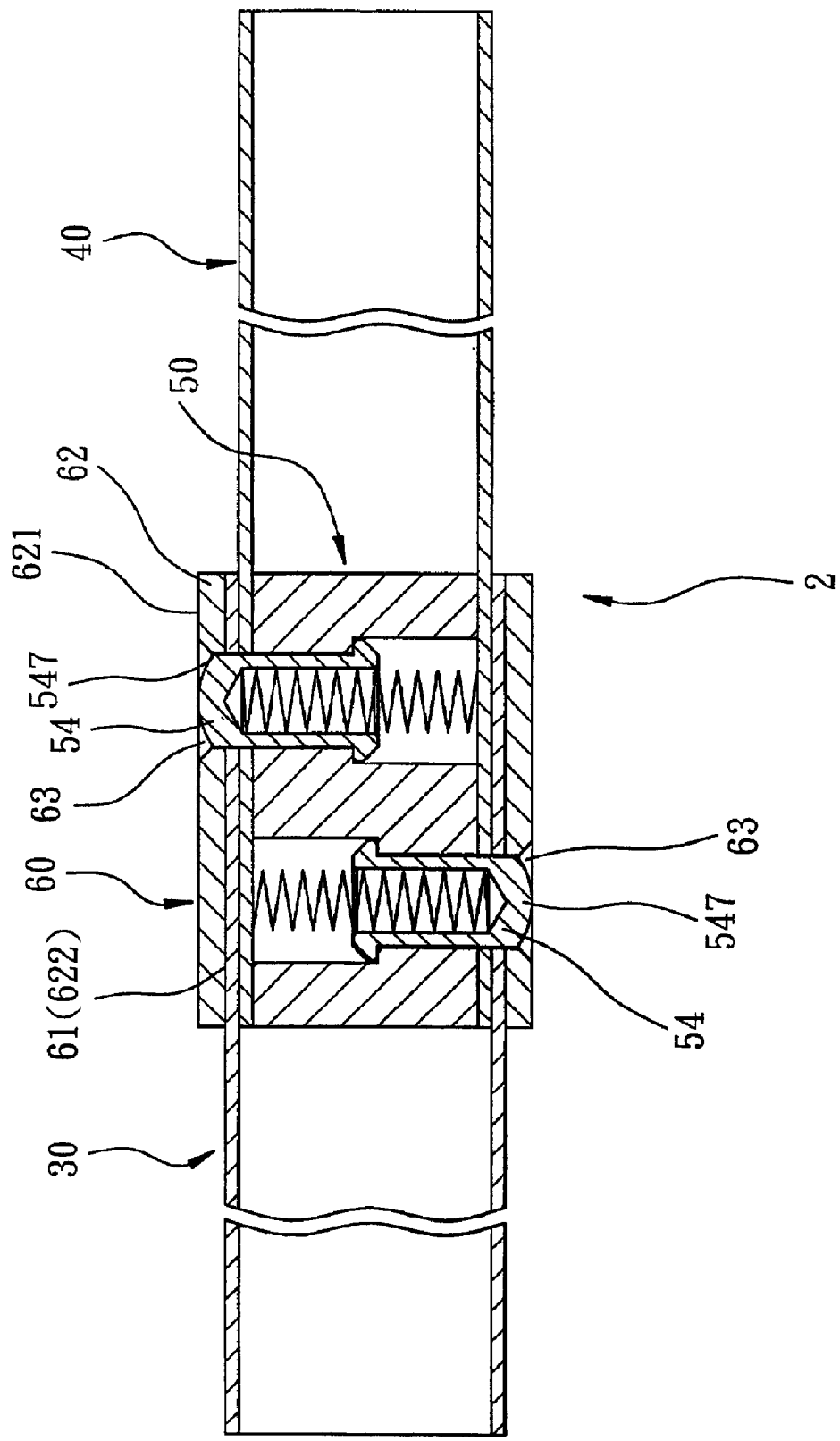
FIG. 8 is a sectional of the second preferred embodiment taken along line 8—8 of FIG. 7.

Referring to FIGS. 7 and 8, the second preferred embodiment of a retractable rod assembly 2 according to the present invention is shown to further comprise a sleeve member 60 sleeved on the outer tube 30.

The sleeve member 60 has a sleeve wall 62 that confines a sleeve hole 61, that has outer and inner wall surfaces 621, 622, and that is formed with first and second radial sleeve holes 63 to be aligned with the first and second outer radial holes 33, respectively. The outer end 547 of the retaining pin 54 of each of the spring-loaded retainers extends into a respective one of the first and second radial sleeve holes 63 in the extended state of the outer and inner tubes 30, 40. The sleeve member 60 has a thickness sufficient to prevent the outer end 547 of the retaining pin 54 of each of the spring-loaded retainers from projecting out of the respective one of the first and second radial sleeve holes 63 in the extended state of the outer and inner tubes 30, 40. As such, accidental pressing of the retaining pins 54 can be avoided in this embodiment.

The following are some of the advantages of the retractable rod assembly of this invention:

Due to the arrangement of the retaining pins 54 and the use of the sleeve member 60 in the second preferred embodiment, the strength of the rod assembly in the extended state of the outer and inner tubes 30, 40 can be enhanced, and accidental or unintentional pressing of the retaining pins 54 can be avoided. Moreover, because axial forces are applied to the biasing members 53, which are in the form of coiled compression springs, elastic deformation of the biasing members 53 can be minimized to prolong the service life of the positioning device 50.

While the present invention has been described in connection with what is considered the most practical and preferred embodiments, it is understood that this invention is not limited to the disclosed embodiments but is intended to cover various arrangements included within the spirit and scope of the broadest interpretation so as to encompass all such modifications and equivalent arrangements.

I claim:

1. A retracting rod assembly, comprising:
    an outer tube having an outer tube wall defining an outer tube axis, said outer tube wall having formed therein first and second outer radial holes spaced apart from each other along the outer tube axis by a first distance, said first and second outer radial holes forming a first angle that ranges from 90 to 180 degrees therebetween with respect to the outer tube axis;
    an inner tube having an inner tube wall defining an inner tube axis, said inner tube structured to slidably fit within said outer tube, said inner tube having formed therein first and second inner radial holes spaced apart from each other along the inner tube axis by a second distance equal to the first distance, said first and second inner radial holes forming a second angle with respect to the inner tube axis and equal to the first angle, and wherein said inner tube is insertable into said outer tube to coincide said inner tube axis and outer tube axis and to align said first and second inner radial holes with said first and second outer radial holes, respectively, in an extended state of said outer and inner tubes;
    a sleeve member coaxially fitted over said outer tube, said sleeve having formed therein first and second radial sleeve holes aligned respectively with said first and second outer radial holes and further having a sleeve member thickness sufficient to prevent said outer ends of said retaining pins of each of said retainers from projecting out of the respective radial sleeve holes;
    a mounting block disposed in said inner tube and having first and second retainer passages transversely disposed therein and aligned with said first and second inner radial holes, respectively; and
    first and second retainers disposed in corresponding first and second transversely disposed retainer passages and including:
        first and second retaining pins, and
        first and second coiled compression spring members structured to releasably bias said first and second retaining pins extendably outward through respective first and second inner radial holes and through respective first and second outer radial holes and into respective first and second radial sleeve holes in the extended state of said outer and inner tubes.

2. The retractable rod assembly of claim 1:
    wherein each of said first and second transverse retainer passages includes a large-diameter portion and a small-diameter portion;
    wherein each of said first and second retaining pins further includes an inner end, an outer end, a blind hole that extends from said inner end toward said outer end, and a limit flange that extends radially and outwardly from said inner end; and
    wherein said outer ends of said first and second retaining pins of said first and second retainers are structured to extend out of the respective first and second inner radial holes and the respective first and second outer radial holes via said small-diameter portion of respective first and second transverse retainer passages, said inner ends of said first and second retaining pins of said first and second retainers being disposed in said large-diameter portion of the respective first and second transverse retainer passages and being hindered by said limit flanges from extending into said small-diameter portions of the respective first and second retainer passages.

3. The retractable rod assembly as claimed in claim 1 wherein the first and second angles are substantially 180 degrees.

4. The retractable rod assembly as claimed in claim 1 wherein said outer tube wall and said inner tube wall have non-circular and complementary cross-sections.

5. The retractable rod assembly as claimed in claim 1 wherein said first and second retaining pins can be recessed through at least said first and second outer radial sleeve holes and said first and second outer radial holes by a single hand of a user.

* * * * *